(12) United States Patent
Miyashita et al.

(10) Patent No.: US 10,587,823 B2
(45) Date of Patent: Mar. 10, 2020

(54) ENCODING DEVICE COMPRISING VIDEO SWITCHING DEVICE, ENCODING METHOD INCLUDING VIDEO SWITCHING DETECTION METHOD

(71) Applicant: HITACHI KOKUSAI ELECTRIC INC., Tokyo (JP)

(72) Inventors: Atsushi Miyashita, Tokyo (JP); Hiroyuki Takesue, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 16/084,322

(22) PCT Filed: Feb. 2, 2017

(86) PCT No.: PCT/JP2017/003754
§ 371 (c)(1),
(2) Date: Sep. 12, 2018

(87) PCT Pub. No.: WO2017/163619
PCT Pub. Date: Sep. 28, 2017

(65) Prior Publication Data
US 2019/0082120 A1    Mar. 14, 2019

(30) Foreign Application Priority Data
Mar. 24, 2016    (JP) .................................. 2016-060414

(51) Int. Cl.
*H04N 5/268*    (2006.01)
*H04N 19/115*    (2014.01)
(Continued)

(52) U.S. Cl.
CPC ............. *H04N 5/268* (2013.01); *H04N 5/225* (2013.01); *H04N 19/115* (2014.11);
(Continued)

(58) Field of Classification Search
CPC .... H04N 5/268; H04N 19/115; H04N 19/124; H04N 19/142; H04N 19/162; H04N 5/225
(Continued)

(56) References Cited

U.S. PATENT DOCUMENTS 5,267,039 A * 11/1993 Elberbaum .......... G11B 27/024
                                                              348/143
5,870,139 A *  2/1999 Cooper .................. H04N 7/181
                                                              348/153
(Continued)

FOREIGN PATENT DOCUMENTS

EP    0502673 A2 * 9/1992 ........... H04N 5/0736
JP    08065576 A  * 3/1996
(Continued)

OTHER PUBLICATIONS

International Search Report dated Mar. 21, 2017.

*Primary Examiner* — Michael Lee
(74) *Attorney, Agent, or Firm* — Bacon & Thomas, PLLC

(57) ABSTRACT

A video switching device includes a video switching unit that has at least two video signal input units, and an encoding device. The video switching unit includes a first control detection unit that, on the basis of an externally inputted control signal, outputs a pre-control signal; a second control detection signal that, on the basis of the control signal, outputs a camera switching instruction signal for switching camera video signals during a vertical blanking interval; and a camera video switching unit that switches two video signals. The encoding device includes an encoding unit that encodes video signals; and a control unit that, by means of the pre-control signal, reduces the amount of code generated by the encoding unit.

2 Claims, 10 Drawing Sheets

(51) Int. Cl.
 *H04N 5/225* (2006.01)
 *H04N 19/142* (2014.01)
 *H04N 19/179* (2014.01)
 *H04N 19/162* (2014.01)
 *H04N 19/124* (2014.01)

(52) U.S. Cl.
 CPC ......... *H04N 19/124* (2014.11); *H04N 19/142* (2014.11); *H04N 19/162* (2014.11); *H04N 19/179* (2014.11)

(58) Field of Classification Search
 USPC ........................................................ 348/705
 See application file for complete search history.

(56) References Cited

U.S. PATENT DOCUMENTS

| | | | |
|---|---|---|---|
| 6,456,335 B1* | 9/2002 | Miura | H04N 5/2624 348/14.12 |
| 2002/0188943 A1* | 12/2002 | Freeman | G03C 1/26 725/38 |
| 2007/0098282 A1 | 5/2007 | Kubota et al. | |
| 2010/0091025 A1* | 4/2010 | Nugent | G09G 5/363 345/502 |
| 2011/0292292 A1* | 12/2011 | Goel | H04N 5/04 348/705 |

FOREIGN PATENT DOCUMENTS

| | | | |
|---|---|---|---|
| JP | 2000125284 A | * | 4/2000 |
| JP | 2000125287 A | * | 4/2000 |
| JP | 2001-128165 A | | 5/2001 |
| JP | 2007-124580 A | | 5/2007 |

\* cited by examiner

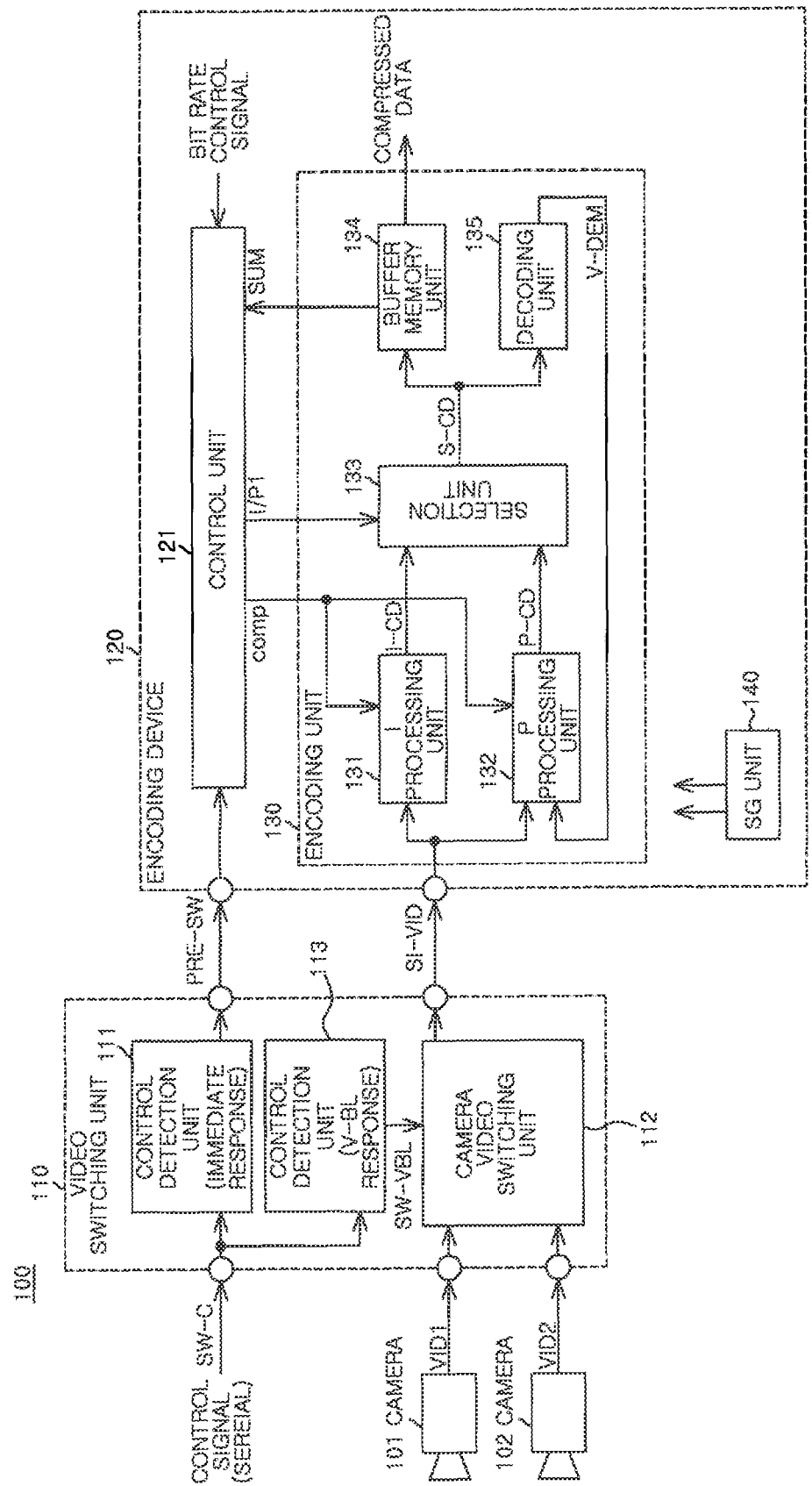

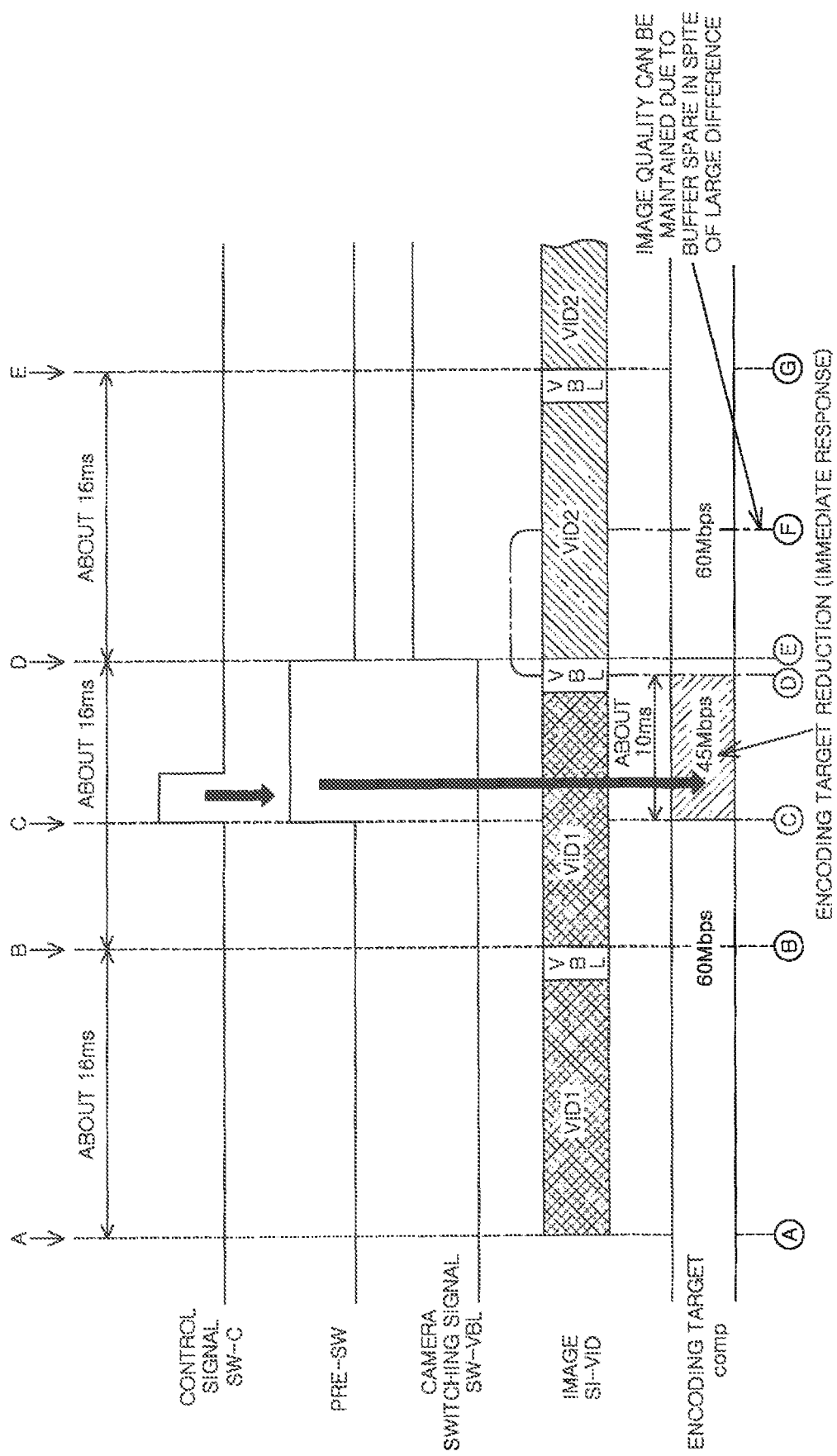

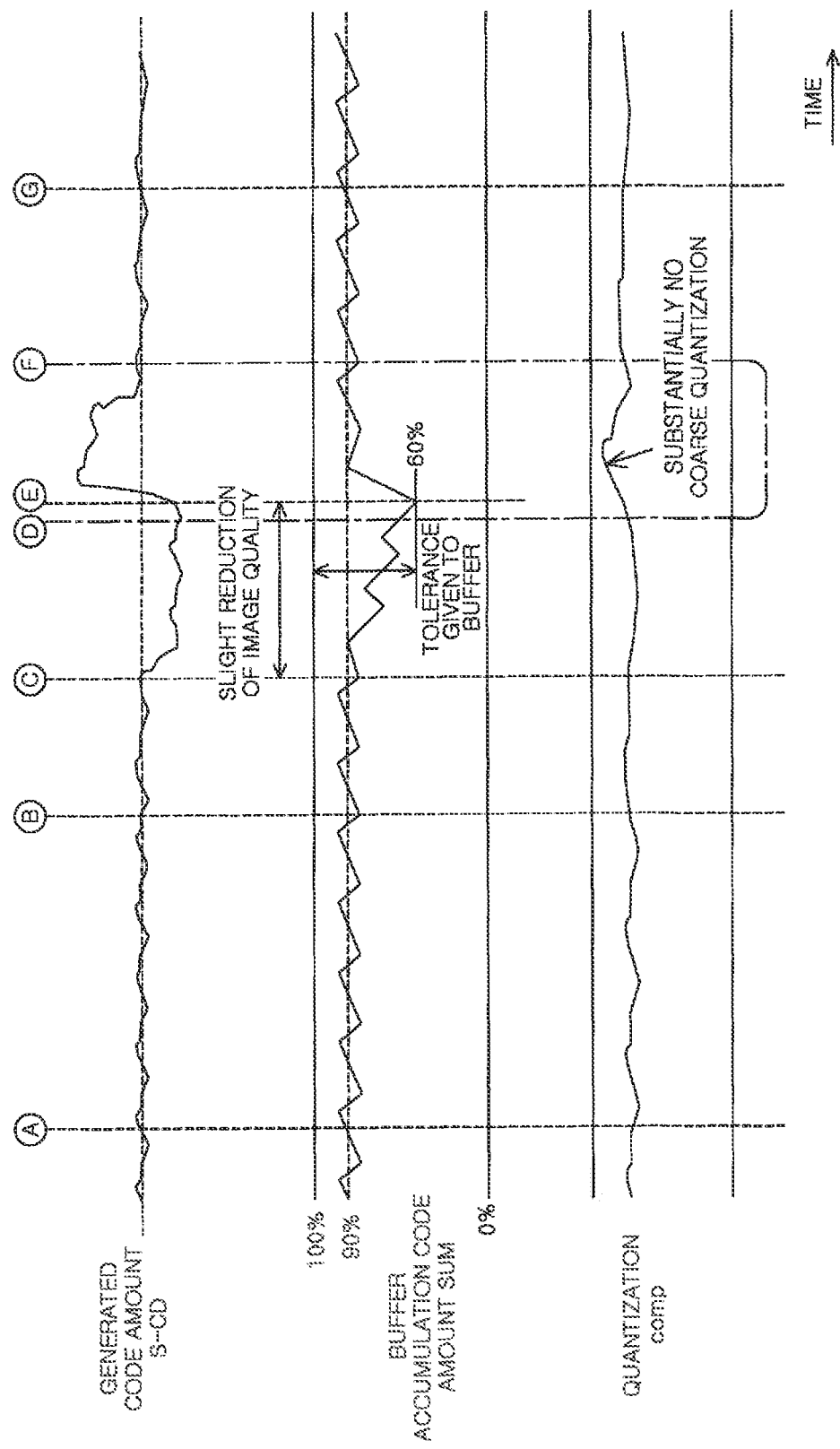

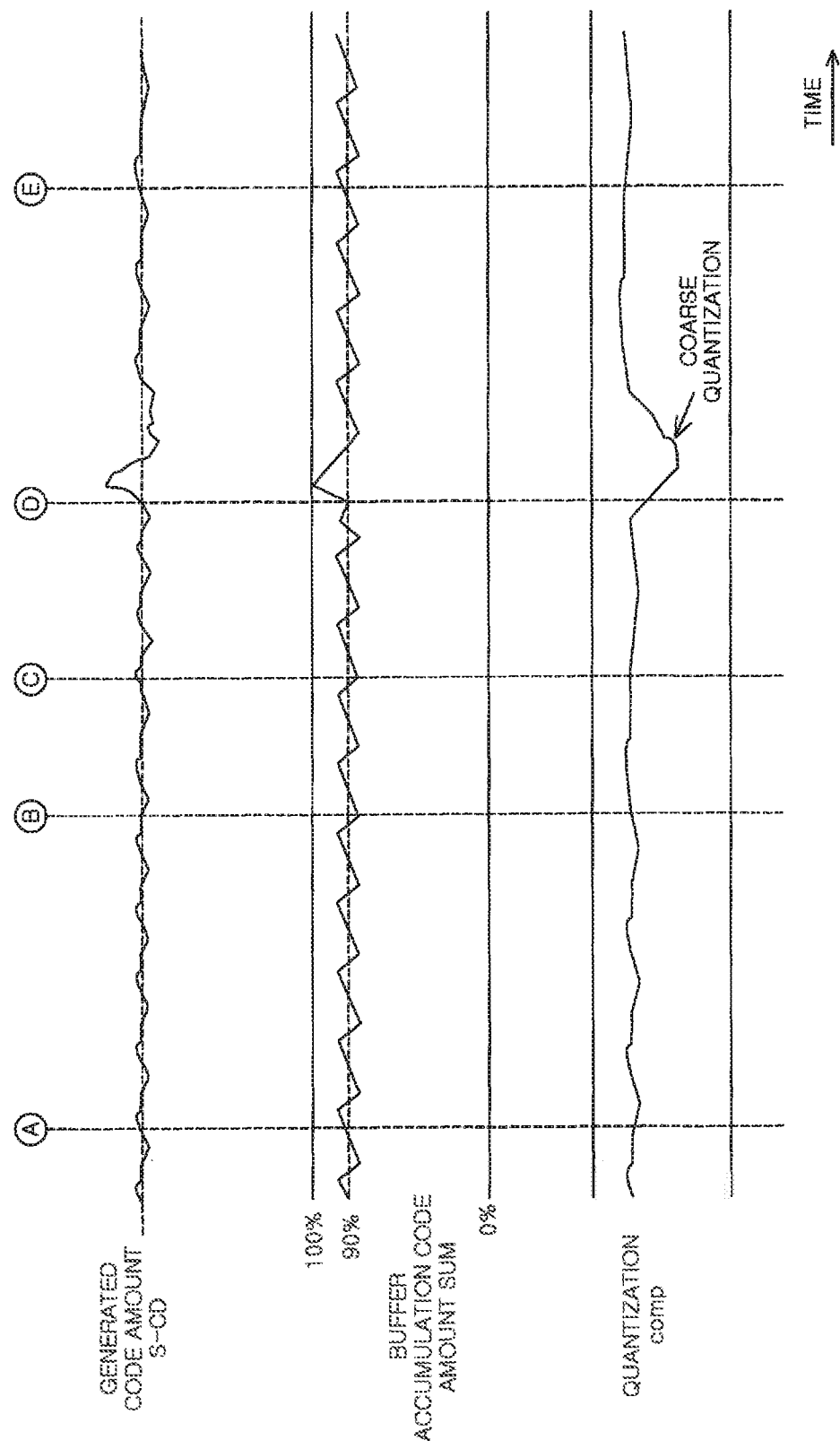

FIG.5A
(RELATED ART)

|              | SIMILAR | DIFFERENT |
|--------------|---------|-----------|
| I PROCESSING | LARGE   | LARGE     |
| P PROCESSING | SMALL   | SMALL     |

GENERATED DATA AMOUNT

FIG.5B
(RELATED ART)

|              | SIMILAR | DIFFERENT |
|--------------|---------|-----------|
| I PROCESSING | POOR    | POOR      |
| P PROCESSING | GOOD    | POOR      |

IMAGE QUALITY (CONSTANT DATA AMOUNT)

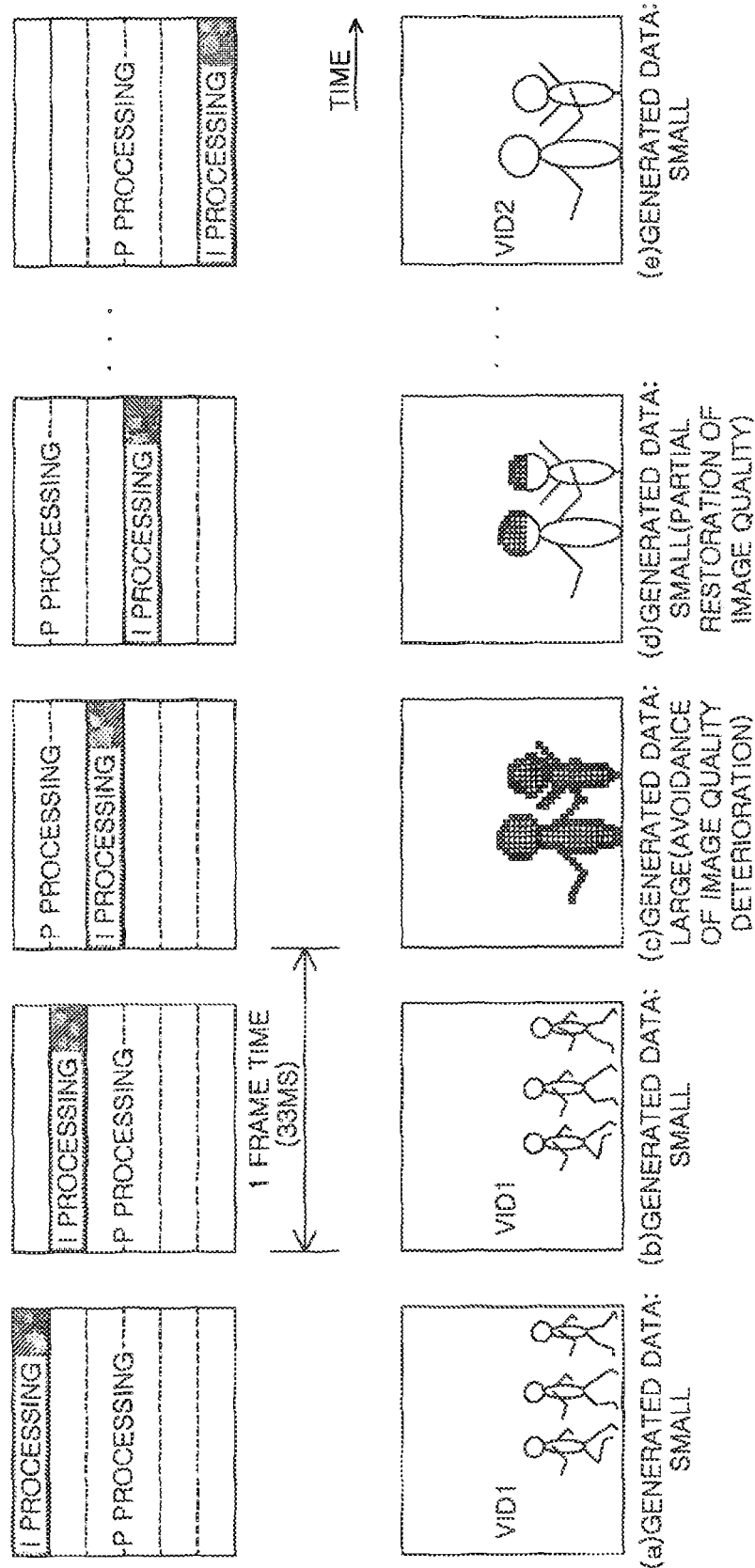

ENCODING DEVICE COMPRISING VIDEO SWITCHING DEVICE, ENCODING METHOD INCLUDING VIDEO SWITCHING DETECTION METHOD

FIELD OF THE INVENTION

The present disclosure relates to an encoding device including a video switching device, and an encoding method including a video switching detection method.

BACKGROUND OF THE INVENTION

A conventional video switching device will be described with reference to FIGS. 3 to 8.

FIG. 3 is a block diagram for explaining the conventional video switching device.

FIGS. 4A and 4B are a timing chart for explaining the operation shown in FIG. 3.

Referring to FIG. 3, a video switching device 300 includes a video switching unit 310 and an encoding device 320.

The video switching unit 310 includes a control detection unit (V-BL, Vertical Blanking response) 113 and a camera video switching unit 112. The video switching unit 310 has two input terminals for inputting video signals VID1 (Video1) and VID2 (Video2), and an output terminal for outputting a video signal SI-VID (Selected-Video).

When a control signal (serial) SW-C is inputted from the outside, the control detection unit (V-BL response) 113 outputs a camera switching instruction signal SW-VBL for switching a video signal during V-BL (Vertical Blanking, vertical blanking interval) to the camera video switching unit 112.

The camera video switching unit 112 outputs a video signal VID1 or VID2 based on the camera switching instruction signal SW-VBL. For example, as shown in FIGS. 4A and 4B, the camera video switching unit 112 outputs VID1 when the camera switching instruction signal SW-VBL of a low-level is outputted, and the camera video switching unit 112 outputs VID2 when the camera switching instruction signal SW-VBL of a high-level.

The video signals VID1 and VID2 are outputted from, e.g., cameras 101 and 102, and the like.

The encoding device 320 includes a control unit 321, an encoding unit 130, and an SG (Sync Generator) unit 140.

The control unit 321 inputs a bit rate control signal and SUM, and outputs a comp control signal and an I/P0 control signal.

The I/P0 control signal outputted from the control unit 321 is a signal that changes while shifting a target range to a lower stage from an upper part of a screen for each frame.

The encoding unit 130 for performing image compression includes an I (Intra-coded Picture) processing unit 131, a P (Predictive-coded Picture) processing unit 132, a selection unit 133, a buffer memory unit 134, and a decoding unit 135.

In the encoding unit 130, the I processing unit 131 generates compressed data I-CD from the inputted video signal SI-VID; the P processing unit 132 generates compressed data P-CD from the inputted video signal SI-VID; the selection unit 133 selects the compressed data I-CD or P-CD and outputs the selected data S-CD to the buffer memory unit 134; and the buffer memory unit 134 outputs compressed data. Further, the decoding unit 135 decodes the selected data S-CD and outputs the decoded video signal V-DEM to the P processing unit 132.

FIG. 6 is a block diagram for explaining the operation of the I processing unit.

The I processing unit 131 includes a converting unit 801, a quantization unit 802, and a Huffman coding unit 803. The converting unit 801 performs, e.g., DCT (Discrete Cosine Transform) conversion on the inputted video signal SI-VID. The quantization unit 802 and the Huffman coding unit 803 create and output the compressed data I-CD.

FIG. 7 is a block diagram for explaining the operation of the P processing unit.

The P processing unit 132 includes a difference unit 904, a converting unit 801, a quantization unit 802, and a Huffman coding unit 803. The difference unit 904 obtains a difference between the video signal SI-VID of the current frame and the video signal V-DEM of the previous frame. The converting unit 801 performs, e.g., DCT (Discrete Cosine Transform) conversion, on the difference video signal. The quantization unit 802 and the Huffman coding unit 803 create and output the compressed P-CD.

In the encoding unit 130, a normal video includes a main picture having high correlation with the previous frame with the same picture as that of the previous frame partially shifted. Therefore, the difference between the previous frame image and the current frame image is obtained (referred to as "P processing"). Then, the difference is encoded and quantized to create compressed data.

The I processing is performed on a part of the video, and the P processing is performed on the other part of the video.

The ordinary video is designed to have a small difference between frames and a smaller amount of data. Particularly, a still picture is substantially the same as that of the previous frame. Therefore, in the case of the still picture, the difference is 0 and the amount of data newly generated by the P processing is substantially 0.

FIGS. 5A and 5B explain the amount of generated data and the image quality of similar images and different images between frames in the I processing and the P processing of images.

FIG. 5A shows the amount of data generated in the case of performing constant quantization. In the I processing, a large amount data is generated in both of similar images and different images. In the P processing, a small amount of data is generated in similar images and a large amount of data is generated in heterogeneous images.

FIG. 5B shows the image quality obtained when the amount of data is constant. In the I processing, the image quality is poor in both of similar images and different images. In the P processing, the image quality is good in the similar images and is poor in the different images.

FIG. 8 explains an image obtained by conventional image switching.

When the fine components outputted from the converting unit 801 are discarded and decoded, the error from the original image difference is increased. As a result, the image reproducibility is decreased and the image quality deteriorates. Such characteristics are shown in FIGS. 5A, 5B and 8.

In FIG. 8, the entire picture was changed in the third frame (c). Therefore, in each P processing, the changes are increased due to different images, and the amount of generated data tends to be increased. Accordingly, the amount of data is decreased by coarse quantization.

In a transition period in which the amount of generated data tends to be increased in each P processing, the amount of data that can be allocated to the I processing is decreased. Therefore, the image quality of the decoded video deteriorates and details of the entire screen are omitted.

In a prior art document, e.g., in Patent Document 1, in a video sending device having an active system and one or more standby systems, a digital video signal is distributed to the active system and the standby systems, and the amount of video data of each video frame in a decoded output of the active system is calculated by a video change detector. The active system is switched to the standby system to output the video data when it is detected that the amount of video data of each video frame is not changed.

Patent Document 1: Japanese Patent Application Publication No. 2007-43520

SUMMARY OF THE INVENTION

An object of the present invention is to prevent image quality degradation during the switching that occurs when video signals are encoded.

In accordance with an aspect of the present invention, there is provided a video switching device including: a video switching unit having at least two video signal input units; and an encoding device, wherein the video switching unit including: a first control detection unit configured to output a pre-control signal based on a control signal inputted from the outside; a second control detection unit configured to output a camera switching instruction signal for switching a camera video signal during a vertical blanking interval; and a camera video switching unit configured to switch two video signals, wherein the encoding device includes: an encoding unit configured to encode video signals; and a control unit configured to, by means of the pre-control signal, reduce an amount of code generated by the encoding unit.

The control unit may perform control to reduce the amount of code generated by the encoding unit during a high level period of the pre-control signal.

In accordance with an aspect of the present invention, there is provided a video switching method including: inputting at least two video signals; reducing an amount of code generated by a pre-control signal; and switching a camera video signal during a vertical blanking interval.

The video switching method may further include: reducing the amount of generated code during a high-level period of the pre-control signal.

Effect of the Invention

In accordance with the present invention, it is possible to prevent the image quality degradation during the switching that occurs when video signals are encoded.

BRIEF DESCRIPTION OF THE DRAWINGS

FIG. 1 is a block diagram for explaining a video switching apparatus according to an embodiment of the present invention.

FIGS. 2A and 2B are a timing chart for explaining the operation shown in FIG. 1.

FIGS. 4A and 4B are a timing chart for explaining the operation shown in FIG. 3.

FIGS. 5A and 5B explain the amount of generated data and the image quality of similar images and different images in I processing and P processing of images.

FIG. 8 explains an image obtained by conventional image switching.

DETAILED DESCRIPTION OF THE EMBODIMENTS

Figure 3:
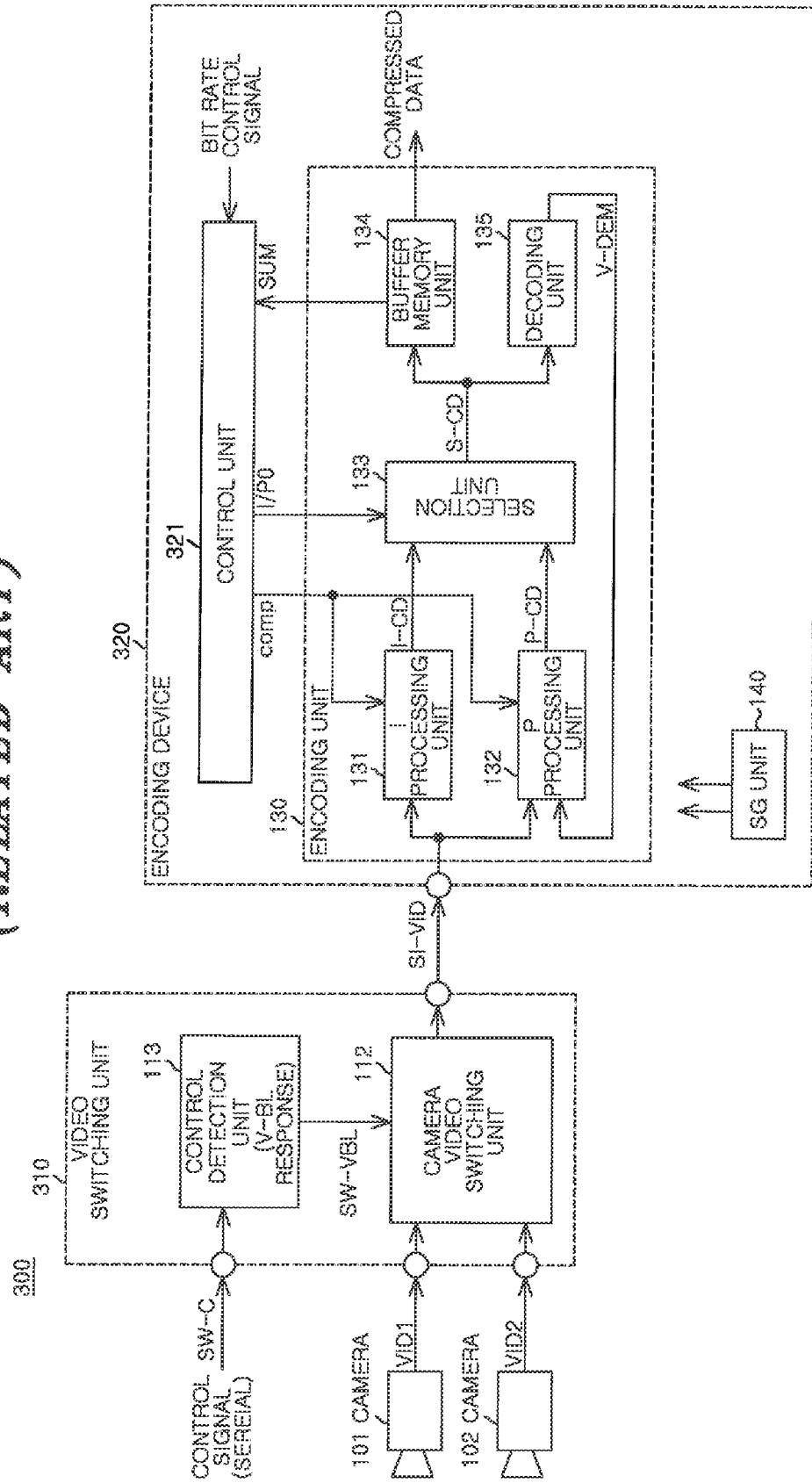
FIG. 3 is a block diagram for explaining a conventional video switching device.
Figure 4A:
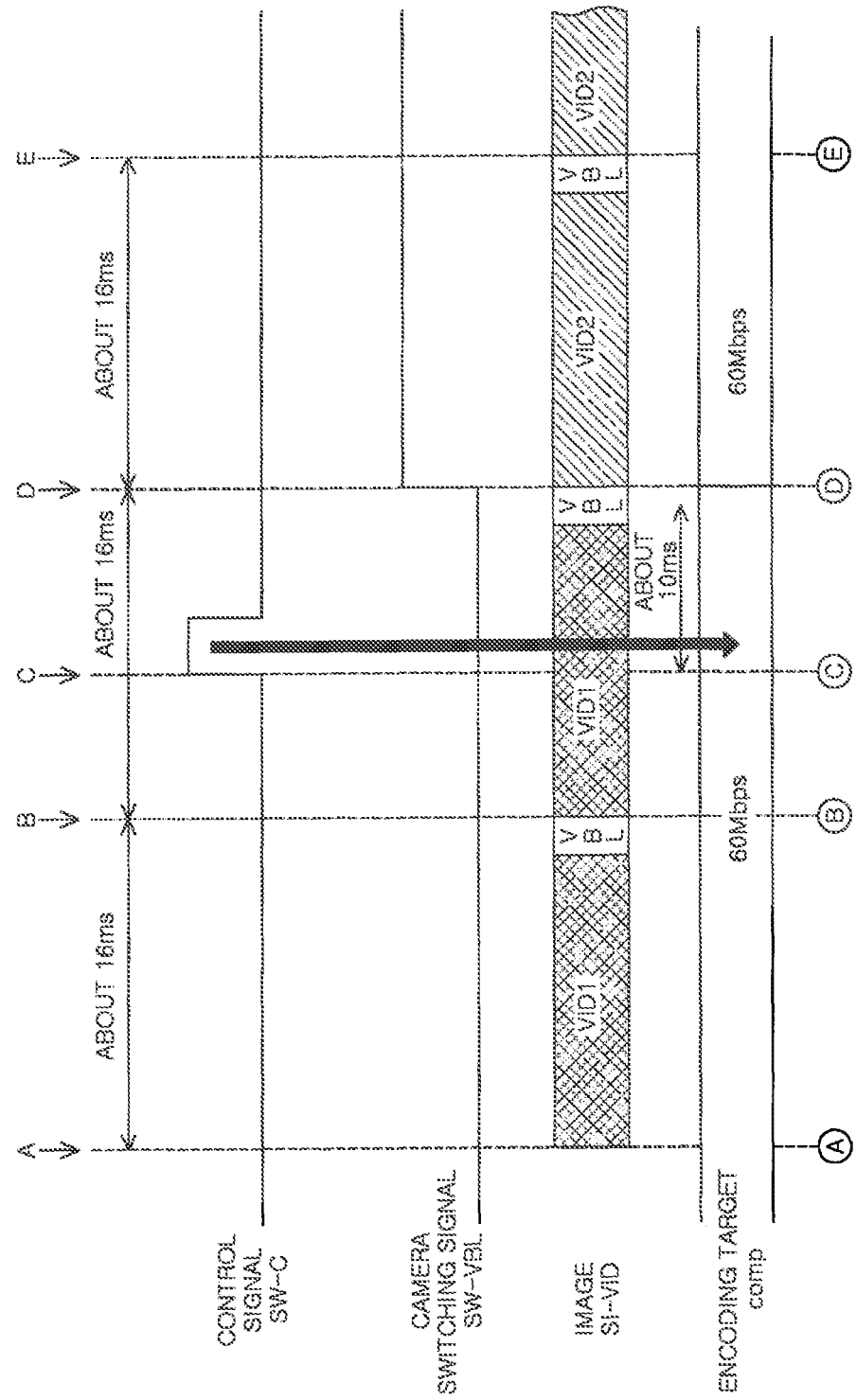

Hereinafter, embodiments of the present invention will be described in detail with reference to the drawings.

FIG. 1 is a block diagram for explaining an image switching apparatus according to an embodiment of the present invention.

In FIG. 1, a video switching device 100 includes a video switching unit 110 and an encoding device 120.

The video switching unit 110 includes a control detection unit (immediate response) 111, a control detection unit (V-BL response) 113, and a camera video switching unit 112. The video switching unit 100 has two input terminals for inputting video signals VID1 (Video1) and VID2 (Video2), an output terminal for outputting a video signal SI-VID (Selected-Video), and an output terminal for outputting a pre-control signal PRE-SW.

The video signals VID1 and VID2 are outputted from the cameras 101 and 102, or the like.

When a control signal (serial) SW-C is inputted from the outside, the control detection unit (immediate response) 111 outputs the pre-control signal PRE-SW.

When the control signal (serial) SW-C is inputted from the outside, the control detection unit 113 outputs a camera switching instruction signal SW-VBL for switching a video signal during V-BL (Vertical Blanking, vertical blanking interval) to the camera video switching unit 112.

The camera video switching unit 112 outputs a video signal of VID1 or VID2 based on the video switching signal SW-VBL. For example, the camera video switching unit 112 outputs VID1 when the camera switching instruction signal SW-VBL of a low level is outputted, and the camera video switching unit 112 outputs VID2 when the camera switching instruction signal SW-VBL of a high-level is outputted.

The encoding device 120 includes a control unit 121, an encoding unit 130, and an SG (Sync Generator) unit 140.

The control unit 121 inputs the pre-control signal PRE-SW, a bit rate control signal and SUM, and outputs a comp control signal and an I/P1 control signal.

In addition, the control unit 121 may input the camera switching instruction signal SW-VBL.

The encoding unit 130 for performing image compression includes an I (Intra-coded Picture) processing unit 131, a P (Predictive-coded Picture) processing unit 132, a selection unit 133, a buffer memory unit 134, and a decoding unit 135.

The SG unit 140 supplies synchronization signals to the encoding unit 120 and the video switching unit 110.

Figure 6:
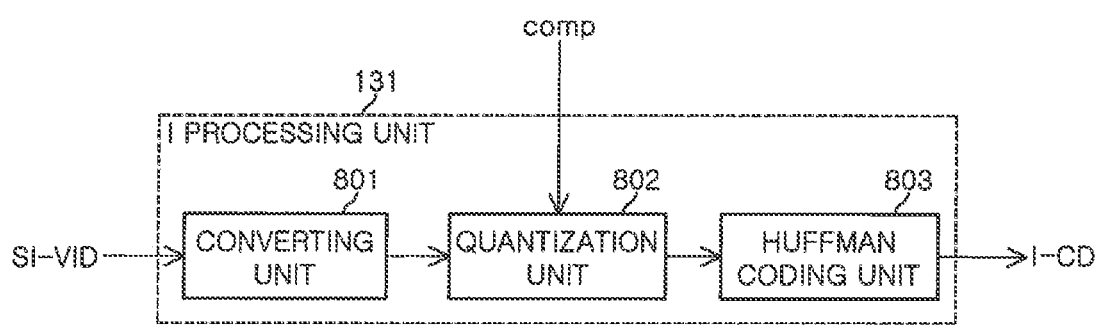
FIG. 6 is a block diagram for explaining the operation of the I processing unit.
Figure 7:
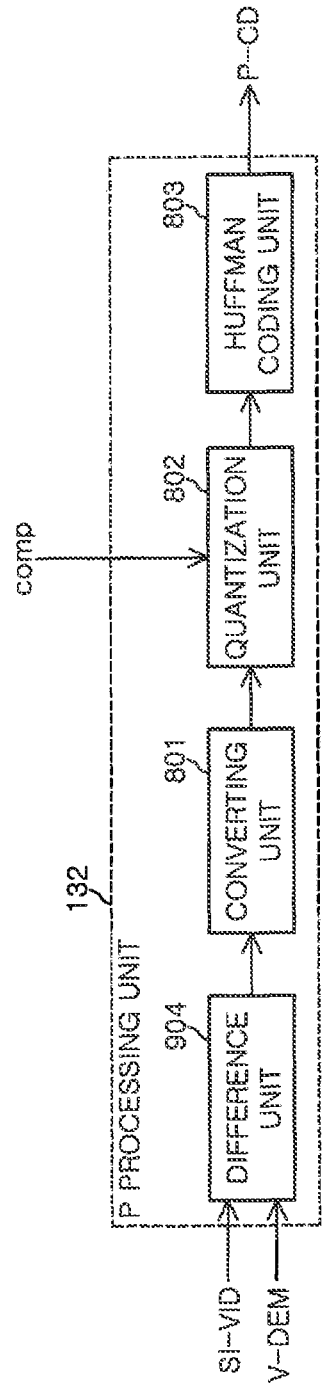
FIG. 7 is a block diagram for explaining the operation of the P processing unit.

The description on the operation of the I processing unit 131 and the P processing unit 132 will be omitted because it has been described with reference to FIGS. 6 and 7.

In the encoding unit 130, the I processing unit 131 generates compressed data I-CD from the inputted video signal SI-VID; the P processing unit 132 generates compressed data P-CD from the inputted video signal SI-VID; the selection unit 133 selects the compressed data I-CD or P-CD and outputs the selected data S-CD to the buffer memory unit 134; and the buffer memory unit 134 outputs compressed data. Further, the decoding unit 135 decodes the selected data S-CD and outputs the decoded video signal V-DEM to the P processing unit 132.

The comp control signal (encoding target) outputted from the control unit 121 is a control signal for increasing or decreasing the amount of code generated by the I processing and the P processing. The I processing unit and the P processing unit increases or decreases the amount of generated code by changing the degree of quantization.

Further, based on the I/P1 control signal outputted from the control unit 121, it is selected whether a control signal to the selection unit 133 is a code according to the I processing or a code according to the P processing. When there are 1280 scanning lines to be selected sequentially from the top of the screen, the 1st to 64th scanning lines are selected for the first frame, the 65th to 128th scanning lines are selected for the second frame, and so on.

The SUM inputted to the control unit 121 is a signal related to the amount of compressed data stored in the buffer memory unit 134.

The control unit 121 controls the degree of quantization, i.e., the amount of newly generated data, by the comp control signal (encoding target) while considering the amount of SUM.

FIGS. 2A and 2B are a timing chart for explaining the operation shown in FIG. 1.

In FIGS. 2A and 2B, the video switching unit 110 outputs the video signal VID1 as the video SI-VID from the camera video switching unit 112 at time A, for example.

Time B indicates a start point of the frame of the video signal VID1.

When the control signal (serial) SW-C is inputted from the outside at time C, for example, the control detection unit (response) 111 outputs the pre-control signal PRE-SW.

The pre-control signal PRE-SW is increased as the control signal (serial) SW-C is increased. The pre-control signal PRE-SW is decreased during the V-BL interval. The high level period of the pre-control signal PRE-SW is, e.g., a period in which the encoding target comp is reduced from 60 Mbps to 45 Mbps.

When the high-level period of the pre-control signal PRE-SW is shorter than, e.g., 5 ms, the camera switching signal SW-VBL may be delayed by one frame. One frame is about 16 ms in the present embodiment.

When the control signal (serial) SW-C is inputted from the outside, the control detection unit (V-BL response) 113 outputs the camera switching instruction signal SW-VBL for switching a video signal during V-BL (Vertical Blanking, vertical blanking interval).

The camera video switching unit 112 outputs the video signal VID1 or VID2 based on the camera switching instruction signal SW-BVL. As shown in FIGS. 2A and 2B, for example, when the low-level camera switching instruction signal SW-VBL is outputted, the camera video switching unit 112 outputs VID1. When the high-level camera switching instruction signal SW-VBL, the camera video switching unit 112 output VID2.

The control unit 121 of the encoding device 120 sets the encoding target comp to 45 Mbps during the high-level period of the pre-control signal PRE-SW and decreases the generated code amount S-CD by setting the degree of the quantization to an intermediate level to obtain 45 Mbps. Accordingly, the image quality of the video signal VID1 slightly deteriorates.

The buffer storage code amount SUM starts to be decreased gradually. The amount of decrease is limited to an allowable lower limit (e.g., 60%).

The camera video switching unit 112 switches the video signal SI-VID to be outputted from the video signal VID1 to the video signal VID2.

The control unit 121 returns the encoding target comp from 45 Mbps to 60 Mbps at time D.

In the selection unit 133, a selection ratio of the I processing is considerably increased because the video is considerably different from the previous frame at the time D.

Accordingly, the generated code amount S-CD outputted from the selection unit 133 is also increased. Since, however, the buffer storage code amount SUM is already decreased, it is not necessary to extremely reduce the generated code amount S-CD stored in the buffer memory unit 134.

Even if the encoding target comp temporarily exceeds 60 Mbps, it is sufficient to obtain the buffer accumulation code amount SUM by performing intermediate-level quantization.

As a result, the image quality of the video signal VID2 can be maintained.

At time E, the video signal SI-VID is switched to the video signal VID2 to be the second frame.

The control signal SW-C may be a parallel signal.

The video switching apparatus according to the embodiment of the present invention can prevent image quality degradation during the switching that occurs when video signals are encoded.

Although one embodiment of the present invention has been described in detail above, the present invention is not limited to the above-described embodiment, and various modifications can be made without departing from the spirit of the present invention.

This application claims priority to Japanese Patent Application No. 2016-060414 filed on Mar. 24, 2016, the entire contents of which are incorporated herein by reference.

INDUSTRIAL APPLICABILITY

By reducing the encoding target before the switching of the video signal, the buffer memory unit may have a spare capacity and, thus, the image quality degradation during the switching that occurs when the video signals are encoded can be prevented.

DESCRIPTION OF REFERENCE NUMERALS

100, 300: video switching apparatus
101, 102: camera
110, 310: video switching unit
111: control detection unit (response)
112: camera video switching unit
113: control detection unit (V-BL response)
120, 320: encoding device
121, 321: control unit
130: encoding unit
131: I processing unit
132: P processing unit
133: selection unit
134: buffer memory unit
135: decoding unit
140: SG unit
801: converting unit
802: quantization unit
803: Huffman coding unit
904: difference unit

What is claimed is:

1. A video switching device comprising:
 a video switching unit having video signal input units to which video signals from at least two cameras are inputted; and an encoding device configured to encode video signals from the video switching unit, wherein the video switching unit including:

a first control detection unit configured to output a pre-control signal based on a control signal inputted from an outside;

a second control detection unit configured to output a camera switching signal for switching a camera video signal during a vertical blanking interval; and a camera video switching unit configured to switch and output video signals inputted through the video signal input units based on the camera switching signal when the camera switching signal is outputted from the second control detection unit, wherein the encoding device includes:

an encoding unit configured to encode video signals outputted from the camera video switching unit; and a control unit configured to, by means of the pre-control signal outputted from the first control detection unit, reduce an amount of code generated by the encoding unit, and wherein the first control detection unit starts to output the pre-control signal in immediate response to the control signal inputted from the outside, and stops the output of the pre-control signal when the camera video signal is switched during the vertical blanking interval based on the control signal.

2. The video switching device according to claim 1, wherein when an output period of the pre-control signal is shorter than a predetermined period of time, the output of the camera switching signal is delayed by one frame.

* * * * *